United States Patent
Koh et al.

(10) Patent No.: US 10,889,190 B2
(45) Date of Patent: Jan. 12, 2021

(54) APPARATUS FOR CONTROLLING ELECTRIC VEHICLE CHARGING SYSTEM

(71) Applicant: LSIS CO., LTD., Gyeonggi-do (KR)

(72) Inventors: Kwang-Soo Koh, Gyeonggi-do (KR); Ho-Hyun Kang, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 86 days.

(21) Appl. No.: 15/383,011

(22) Filed: Dec. 19, 2016

(65) Prior Publication Data

US 2017/0305291 A1 Oct. 26, 2017

(30) Foreign Application Priority Data

Apr. 20, 2016 (KR) ........................ 10-2016-0048425

(51) Int. Cl.
| | |
|---|---|
| *H02J 7/00* | (2006.01) |
| *B60L 11/18* | (2006.01) |
| *H02J 7/04* | (2006.01) |
| *B60L 53/20* | (2019.01) |
| *B60L 58/21* | (2019.01) |

(52) U.S. Cl.
CPC ........... *B60L 11/1864* (2013.01); *B60L 53/20* (2019.02); *B60L 58/21* (2019.02); *H02J 7/0019* (2013.01); *H02J 7/0026* (2013.01); *H02J 7/0027* (2013.01); *H02J 7/0071* (2020.01); *H02J 7/045* (2013.01); *Y02T 10/70* (2013.01)

(58) Field of Classification Search
CPC .............. B60L 11/1811; B60L 11/1864; B60L 11/1861; B60L 11/1887; B60L 53/20; B60L 58/21; B60L 58/10; B60L 58/20; B60L 2240/547; H02J 7/0026; H02J 7/0071; H02J 7/0019; H02J 7/0027; H02J 7/045; Y02T 10/7055; Y02T 90/14
USPC ......................................................... 320/109
See application file for complete search history.

(56) References Cited

U.S. PATENT DOCUMENTS

| | | | |
|---|---|---|---|
| 6,291,965 B1 * | 9/2001 | Nagai ................. | H02J 7/00047 320/106 |
| 6,803,746 B2 | 10/2004 | Aker et al. | |
| 2007/0247107 A1 * | 10/2007 | Wang ................... | H02J 7/0071 320/107 |

(Continued)

FOREIGN PATENT DOCUMENTS

| | | |
|---|---|---|
| JP | H09-103033 A | 4/1997 |
| JP | 2010104230 A | 5/2010 |

(Continued)

OTHER PUBLICATIONS

Japanese Decision of Refusal dated Aug. 1, 2017 corresponding to application No. 2016-230667.

(Continued)

*Primary Examiner* — Richard Isla
*Assistant Examiner* — Johali A Torres Ruiz
(74) *Attorney, Agent, or Firm* — K&L Gates LLP

(57) ABSTRACT

Disclosed herein is an apparatus for controlling an electric vehicle charging system. The apparatus charges each of a plurality of batteries up to a first preset voltage lower than a full charge voltage by voltage control, charges the plurality of batteries up to a predetermined percentage of a second preset voltage that is the full charge voltage by current control, and charges the plurality of batteries up to the second preset voltage by the voltage control.

4 Claims, 3 Drawing Sheets

(56) References Cited

U.S. PATENT DOCUMENTS

| | | | |
|---|---|---|---|
| 2009/0085528 A1* | 4/2009 | Yamada | H01M 10/44 320/160 |
| 2010/0315089 A1* | 12/2010 | Rapich | H02J 7/0047 324/426 |
| 2013/0054069 A1* | 2/2013 | Komiya | B60L 58/14 701/22 |
| 2014/0055080 A1* | 2/2014 | Ishikura | H02J 7/02 320/103 |
| 2014/0191720 A1* | 7/2014 | Sugiyama | B60L 15/007 320/109 |
| 2014/0340044 A1* | 11/2014 | Kim | H02J 7/0016 320/134 |
| 2016/0072318 A1 | 3/2016 | Cheng et al. | |

FOREIGN PATENT DOCUMENTS

| | | |
|---|---|---|
| JP | 2013-226008 A | 10/2013 |
| JP | 2014-23361 A | 2/2014 |
| JP | 2014-235997 A | 12/2014 |
| JP | 2014239630 A | 12/2014 |
| JP | 2015-136203 A | 7/2015 |
| JP | 2015-177701 A | 10/2015 |
| JP | 5874268 B2 | 1/2016 |
| KR | 10-1229139 B1 | 2/2013 |
| KR | 10-2014-0084543 A | 7/2014 |
| KR | 10-1542112 B1 | 8/2015 |
| KR | 10-2016-0009321 A | 1/2016 |
| KR | 10-1582577 B1 | 1/2016 |

OTHER PUBLICATIONS

The Japanese Office Action dated Apr. 18, 2017 in connection with the counterpart Japanese Patent Application.

\* cited by examiner

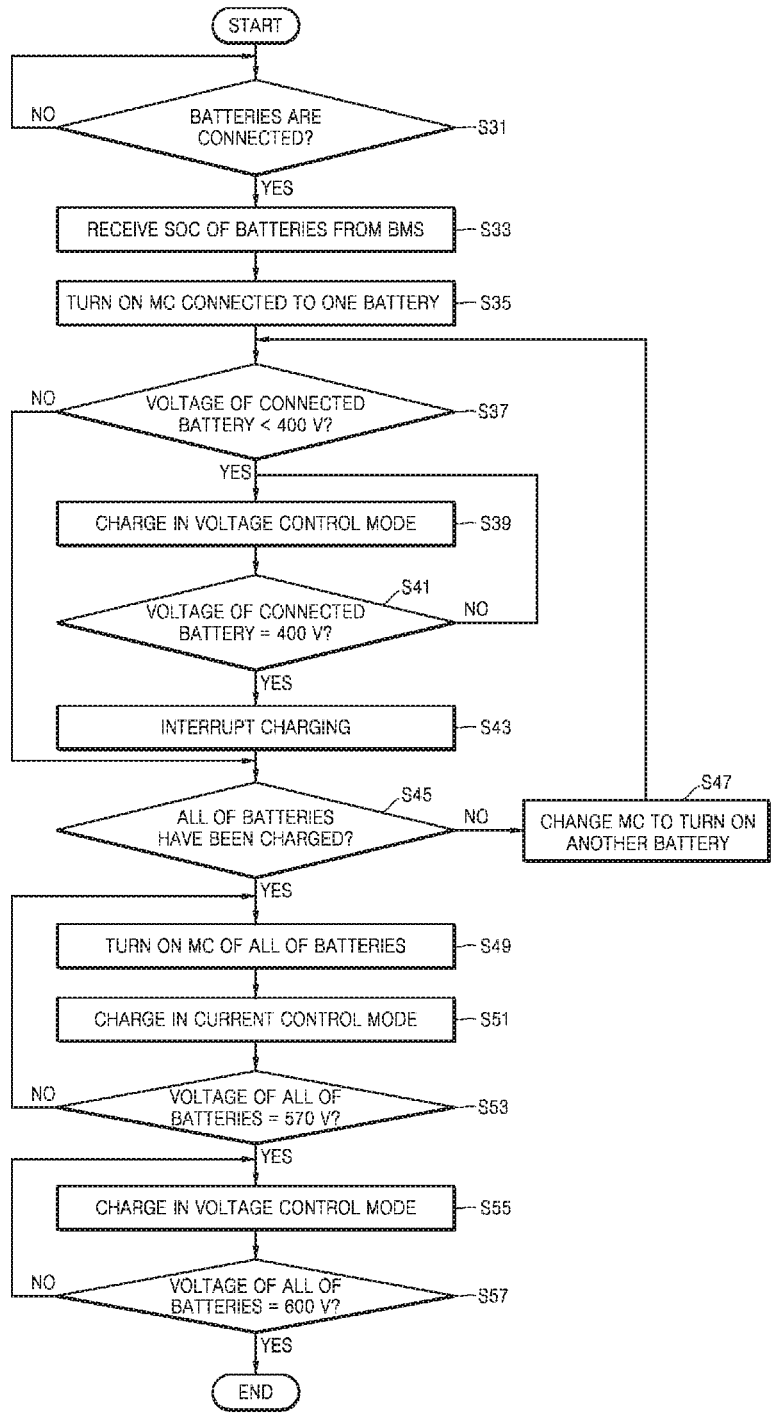

APPARATUS FOR CONTROLLING ELECTRIC VEHICLE CHARGING SYSTEM

CROSS REFERENCE TO RELATED APPLICATION

This application claims the benefit of Korean Patent Application No. 10-2016-0048425, filed on Apr. 20, 2016, entitled "APPARATUS FOR CONTROLLING ELECTRIC VEHICLE CHARGING SYSTEM", which is hereby incorporated by reference in its entirety into this application.

BACKGROUND

1. Technical Field

The present disclosure relates to an apparatus for controlling an electric vehicle charging system.

2. Description of the Related Art

Generally, an electric vehicle charging system is a station where power generated from renewable energy such as sunlight, wind power, fuel cells or from the power system can be stored in the battery of an electric vehicle.

Depending on types of electric vehicles, the ways of charging electric vehicles may be divided into a direct charging manner and a battery replacing manner.

The direct charging manner is divided into a slow charging fashion and a rapid charging fashion. The slow charging fashion is used for residential buildings or parking lots. In this manner, electricity rate is cheap but there is a shortcoming in that it takes about five hours to fully charge a battery. The rapid charging fashion is conducted like fueling in gas stations. It is used when the battery has been discharged after an electric vehicle has traveled, and the battery is charged within a short period of time, say thirty minutes at high power.

The battery replacing manner is conducted commonly by using a robot arm to replace the battery semi-automatically or automatically. In this manner, it takes a short period of time to replace a battery but there is a shortcoming in that it requires the additional cost for installing the station and replacing the battery.

FIG. 1 is a block diagram of an existing electric vehicle charging system of direct charging type.

The existing electric vehicle charging system includes a battery 100, a power conversion system (PCS) 200 and a power system 300. The PCS 200 uses power from the power system 300 to charge the battery 100 slowly or rapidly.

In doing so, a battery management system (BMS) 400 monitors the state of charge (SOC) of the battery 100, the current, voltage, temperature of the battery 100 and the like and provides the information to a control unit of the system.

Such existing electric vehicle cross-section of system operates unidirectionally. Single converter is used to charge a single battery. In large cities or densely populated areas, it is required to increase the efficiency of such electric vehicle charging systems to reduce spatial constraints or the cost.

SUMMARY

It is an object of the present disclosure to provide an apparatus for controlling an electric vehicle charging system capable of charging a plurality of batteries simultaneously by using a single converter.

In accordance with one aspect of the present disclosure, an apparatus for controlling an electric vehicle charging system includes: a battery management system (BMS) configured to provide information associated with state of charge of a plurality of batteries; a plurality of magnetic switches each connected to the respective plurality of batteries; a converter unit configured to convert AC voltage applied from a power system into DC voltage to supply it to the batteries; and a control unit configured to: charge each of the plurality of batteries up to a first preset voltage by voltage control, charge the plurality of batteries up to a percentage of a second preset voltage by current control, and charge the plurality of batteries up to the second preset voltage by the voltage control, wherein the first voltage is lower than a full charge voltage and the second voltage is the full charge voltage.

The control unit may turn on a first magnetic switch connected to a first battery among the plurality of batteries, and may turn off the first magnetic switch when the voltage of the first battery reaches the first preset voltage.

The control unit may turn on the plurality of magnetic switches connected to the plurality of batteries, respectively, if the plurality of batteries is charged up to the first preset voltage.

The converter unit may convert DC voltage supplied from at least one of the plurality of batteries into AC voltage and supply it to the power system.

The apparatus may further include: a DC circuit breaker disposed between the plurality of magnetic switches and the converter unit and may prevent overcurrent from being introduced to the batteries.

The apparatus may further include: an AC circuit breaker disposed between the converter unit and the power system and may prevent overcurrent from being introduced to the power system.

According to an exemplary embodiment of the present disclosure, the plurality of batteries can be charged simultaneously and thus the efficiently of the system can be improved.

BRIEF DESCRIPTION OF DRAWINGS

FIG. 3 is a flowchart for illustrating a method of controlling electric vehicle charging system according to an exemplary embodiment of the present disclosure.

DETAILED DESCRIPTION

Since the present disclosure may be variously modified and have several exemplary embodiments, specific exemplary embodiments will be shown in the accompanying drawings and be described in detail in a detailed description. However, it is to be understood that the present disclosure is not limited to the specific exemplary embodiments, but includes all modifications, equivalents, and substitutions included in the spirit and the scope of the present disclosure.

Hereinafter, exemplary embodiments of the present disclosure will be described in detail with reference to the accompanying drawings.

Figure 1:
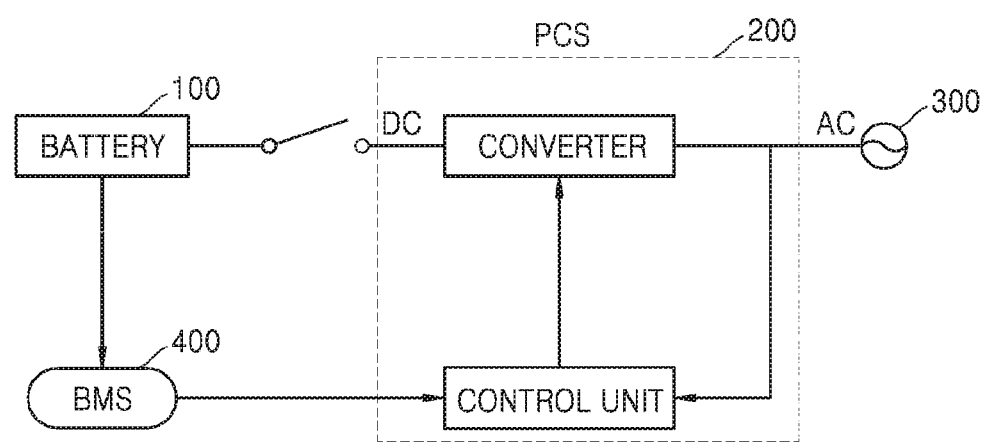
FIG. 1 is a block diagram of an existing electric vehicle charging system.
Figure 2:
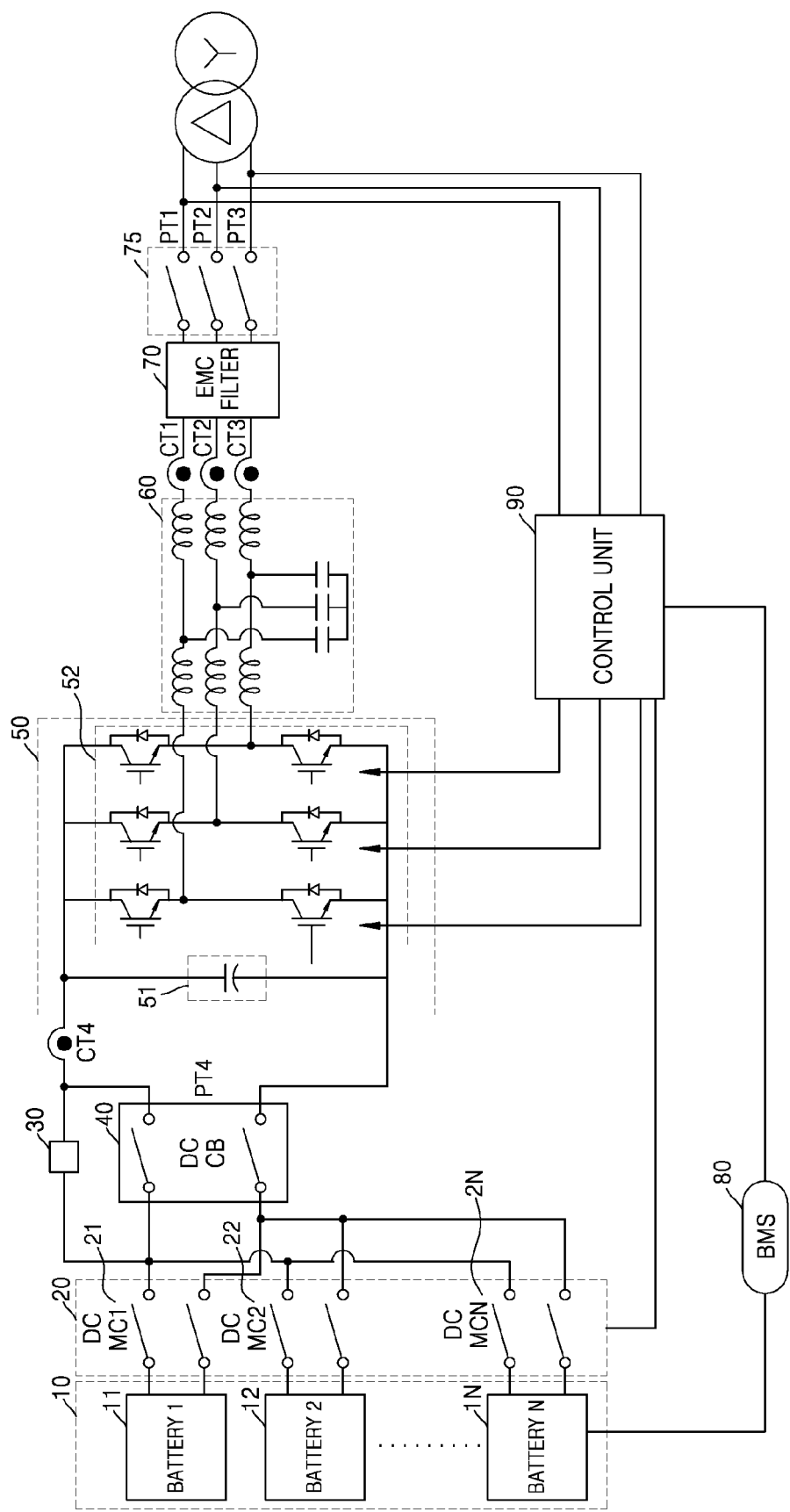
FIG. 2 is a block diagram of an electric vehicle charging system according to an exemplary embodiment of the present disclosure.

FIG. 2 is a block diagram of an electric vehicle charging system according to an exemplary embodiment of the present disclosure.

As shown in FIG. 2, the charging system according to the exemplary embodiment is connected to a battery unit 10 comprised of a plurality of batteries. The system may include a magnetic switch unit 20 comprised of a plurality of magnetic switches each connecting the respective batteries to the system, an initial charging unit 30, a DC circuit breaker 40, a bi-directional converter unit 50, a first filter unit 60, a second filter unit 70, an AC circuit breaker 75, a battery management system (BMS) 80, and a control unit 90.

The battery unit 10 may consist of a plurality of batteries 11 to 1N. Although the figures show only the batteries of electric vehicles, it will be understood that the batteries are mounted in the electric vehicles.

The plurality of batteries 11 to 1N of the battery unit 10 may be connected to/disconnected from the system by the DC magnetic switches 21 to 2N of the magnetic switch unit 20, respectively. The contact point of each of the magnetic switches 21 to 2N may be opened/closed by an electronic coil.

The initial charging unit 30 limits peak current to prevent a fault in the magnetic switches 21 to 2N by peak current. The initial charging unit 30 may consist of relays and resistors, for example. However, other types of the initial charging unit 30 may also be used.

The DC circuit breaker 40 may interrupt current flow to prevent an accident occurring when overcurrent, i.e., a current above a rated current is introduced from the converter unit 50 to the battery unit 10.

Although not shown in FIG. 2, a fuse may be disposed between the DC magnetic switch unit 20 and the DC circuit breaker 40, to protect switching elements of the switching unit 52 of the converter unit 50.

The AC circuit breaker 75 may interrupt current flow to prevent an accident occurring when a current above a rated current is introduced from the power system to the charging system.

The second filter unit 70 is an electromagnetic compatibility (EMC) filter, for example, and filters noise in power supplied from the power system. The first filter unit 60 may be an LCL filter, for example, and may reduce harmonics in the power supplied from the converter 50 to the power system.

It will be appreciated by those skilled in the art that the configurations of the first and second filter units 70 and 75 are merely illustrative and that the system according to exemplary embodiments of the present disclosure may include more filters.

The bi-directional converter 50 includes a smoothing unit 51 and a switching unit 52. The switching unit 52 may include a plurality of switching elements, e.g., power semiconductor switching elements such as insulated gate bipolar mode transistor (IGBT). The plurality of switching elements may be switched on/off by the control unit 90.

The switching unit 52 of the bi-directional converter unit 50 may convert the AC voltage corresponding to the mains electricity supplied from the power system into DC voltage under the control of the control unit 90 to supply it to the smoothing unit 51, or may convert DC voltage supplied from the battery unit 10 to be stored in the smoothing unit 510 into AC voltage to supply it to the power system.

With such configuration of the bi-directional converter 50, the system according to the exemplary embodiment may also be used as an energy storage system (ESS) or a distributed power supply.

The smoothing unit 51 includes electrolytic capacitors. It may smooth the DC voltage supplied by the switching unit 52 or may smooth the DC voltage supplied from the battery unit 10.

The BMS 80 may measure in real-time information associated with the state of charge of each of the plurality of batteries 11 to 1N, e.g., the voltage, current, temperature of the plurality of batteries 11 to 1N, and may provide it to the control unit 90.

The control unit 90 according to the exemplary embodiment of the present disclosure receives information associated with the state of charge of the plurality of batteries from the BMS 80 and controls the charging of the plurality of batteries. When the plurality of batteries is connected to the charging system, the control unit 90 may check the input number of the batteries via the BMS 80 and may control the plurality of switching elements of the switching unit 52 accordingly.

Initially, when the plurality of batteries is connected to the charging system the BMS 80 may check the current, voltage, temperature and the like of each of the batteries to determine the state of charge and may predict the remaining capacity.

The control unit 90 receives data associated with the state of charge from the BMS 80 and determines the state of the charge of the plurality of batteries. Subsequently, when the first battery 11 is connected, it is initially charged by the initial charging unit 30, the first magnetic switch 21 connecting the first battery 11 is closed, and the switching unit 52 of the converter 50 is controlled. Accordingly, the first battery may be charged up to a preset voltage, e.g., 400 V by voltage control. The voltage control refers to charging a battery by supplying a current at a constant voltage. When the first battery 11 is charged up to the preset voltage, e.g., 400 V, the first magnetic switch 21 is opened, and then the second battery 12 is charged by the voltage control in the above-described order.

After all of the batteries of the battery unit 10 is charged, all of the magnetic switches of the magnetic switch unit 20 are closed such that the plurality of batteries is connected to one another in parallel, and the switching unit 52 is controlled so that the batteries are charged to a preset voltage by current control. The current control refers to charging a battery by supplying a voltage at a constant current. The preset voltage for the current control charging may be set to 95% of the full charge for safety of the battery. e.g., 570 V.

Subsequently, the switching unit 52 is controlled so that the plurality of batteries is fully charged by voltage control again, and then the parallel charging may be completed. This will be described in detail again with reference to FIG. 3.

FIG. 3 is a flowchart for illustrating a method of controlling electric vehicle charging system according to an exemplary embodiment of the present disclosure. FIG. 3 shows a method by which the control unit 90 according to an exemplary embodiment of the present disclosure controls the system.

As shown in FIG. 3, according to an exemplary embodiment of the present disclosure, if it is detected that a plurality of batteries is connected to the system (Yes in step S31), the control unit 90 may receive information associated with the state of charge of each of the batteries from the BMS 80 (step S33).

Subsequently, the control unit 90 turns on an magnetic switch connected to one of the batteries, e.g., the first magnetic switch 21 connected to the first battery 11 (step S35). If it is determined that the voltage of the connected first battery 11 is below a first preset voltage, 400 V in this exemplary embodiment, which is lower than the full charge (Yes in step S37), the control unit 90 controls the switching unit 52 so that the first battery 11 is charged in the voltage control mode (step S39). That is, the first battery 11 may be charged by supplying current to the first battery 11 while maintaining the voltage constant.

The control unit 90 keeps charging the first battery 11 in this manner, and if the voltage of the first battery 11 reaches the first preset voltage, i.e., 400 V (Yes in step S41), the control unit may interrupt charging the first battery 11 (step S43).

The control unit 90 may check the state of charge of the other batteries and may determine whether all of the batteries have been charged (step S45). If all of the batteries have not been charged, the control unit 90 may turn off the first magnetic switch 21 and turn on another magnetic switch, e.g., the second magnetic switch 22 (step S47), such that it may return to step S37 to charge a battery connected to the second magnetic switch 22, i.e., the second battery 12.

When the plurality of batteries has been charged, the control unit 90 may turn on the magnetic switches associated with the plurality of batteries (step S49), and may control the switching unit 52 so that the plurality of connected batteries is charged in the current control mode (step S51). That is, each of the plurality of batteries may be charged with voltage while maintaining the current constant.

Subsequently, when voltage of the plurality of batteries reaches a preset percentage of full charge voltage, e.g., 95% in this exemplary embodiment, which is 570 V, for example, (Yes in step S53), the control unit 90 may charge the plurality of batteries in the voltage control mode again. (step S55). When all of the batteries are fully charged, i.e., charged up to 600 V in this exemplary embodiment (Yes in step S57), the control unit 90 may turn off the magnetic switches to complete charging.

As such, according to an exemplary embodiment of the present disclosure, the plurality of batteries can be charged simultaneously and thus the efficiently of the system can be improved.

Although the exemplary embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. An apparatus for controlling an electric vehicle charging system, the apparatus comprising:
    a battery management system configured to provide information associated with a state of charge of a plurality of batteries;
    a plurality of magnetic switches, each connected to the respective plurality of batteries;
    an initial charging unit configured to initially charge the plurality of batteries and configured to limit a peak current while initially charging the plurality of batteries;
    a converter unit configured to convert AC voltage applied from a power system into DC voltage for supply to the batteries;
    a DC circuit breaker disposed between the plurality of magnetic switches and the converter unit and configured to prevent overcurrent from being introduced to the batteries;
    an AC circuit breaker disposed between the converter unit and the power system and configured to prevent overcurrent from being introduced to the power system; and
    a control unit to which at least one of the plurality of batteries is connected via at least one of the magnetic switches,
    wherein at least one of the magnetic switches connecting the at least of one of the plurality of batteries is turned on during the initial charging of the plurality of batteries,
    wherein the control unit is configured to charge each of the plurality of batteries up to a first preset voltage by voltage control,
    wherein the control unit is configured to charge the plurality of batteries up to a preset percentage of a second preset voltage by current control once charged to the first preset voltage, and to then charge the plurality of batteries up to the second preset voltage by voltage control, and
    wherein the first preset voltage is lower than a full charge voltage and the second preset voltage is the full charge voltage.

2. The apparatus of claim 1, wherein the control unit turns on a first magnetic switch connected to a first battery among the plurality of batteries, and turns off the first magnetic switch when the voltage of the first battery reaches the first preset voltage.

3. The apparatus of claim 2, wherein the control unit turns on the plurality of magnetic switches connected to the plurality of batteries, respectively, if the plurality of batteries are charged up to the first preset voltage.

4. The apparatus of claim 1, wherein the converter unit converts DC voltage supplied from at least one of the plurality of batteries into AC voltage and supplies the AC voltage to the power system.

* * * * *